June 2, 1953   J. A. LOVE   2,640,406
DISK BLADE GANG
Filed Aug. 12, 1947
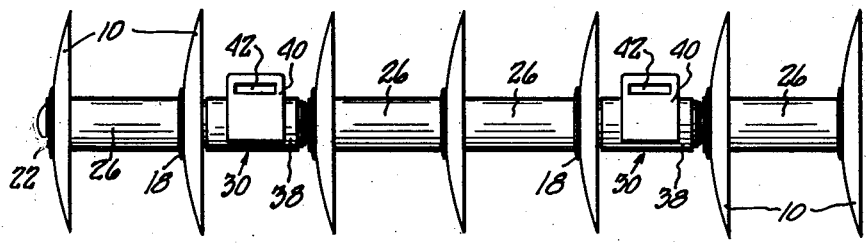
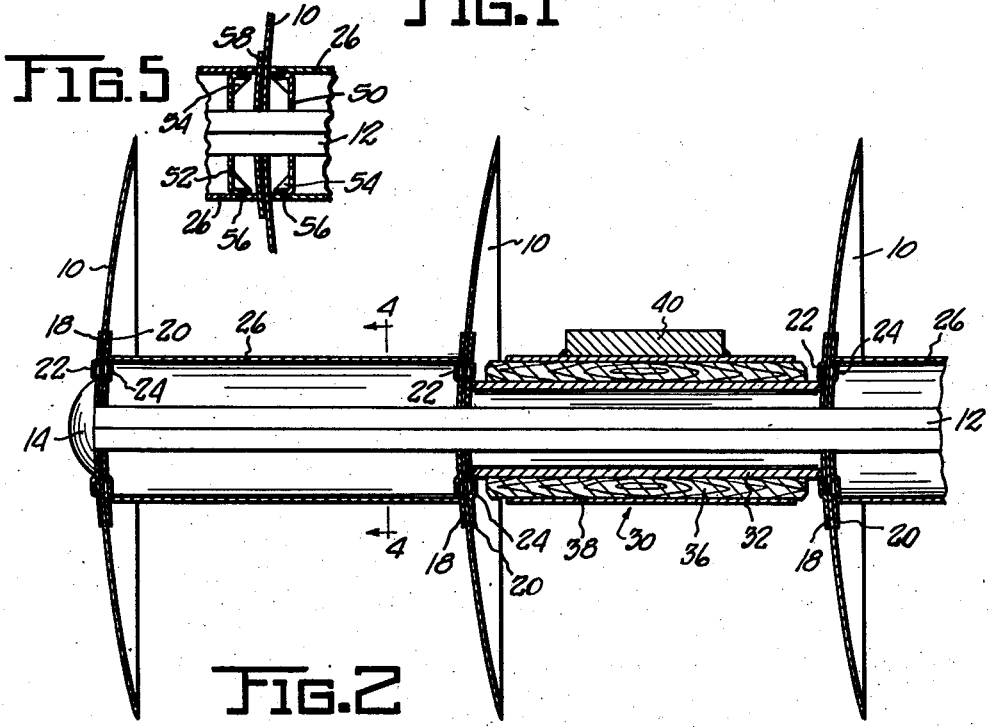
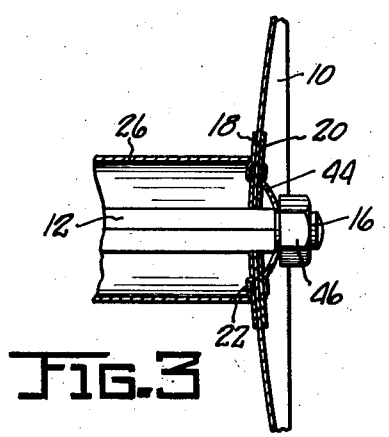
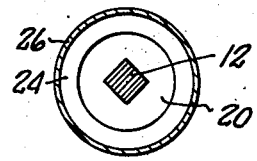
INVENTOR.
JABEZ A. LOVE.
BY
ATTORNEYS Patented June 2, 1953

2,640,406

UNITED STATES PATENT OFFICE 2,640,406

DISK BLADE GANG

Jabez A. Love, Eau Claire, Mich.

Application August 12, 1947, Serial No. 768,168

2 Claims. (Cl. 97—220)

This invention relates to improvements in disk blade gangs, and more particularly to a gang or unit assembly consisting of a plurality of disk blades which are adapted to be used in disk harrows and like agricultural implements.

The primary object of the invention is to provide a novel, simple, inexpensive disk blade gang.

A further object is to provide a disk blade gang of requisite strength and rigidity whose weight is small compared to the weight of disk blade gangs of conventional construction to render the gang particularly well suited to use on harrows of the lift type as shown in my Patent No. 2,320,624, dated June 1, 1943.

A further object is to provide a disk blade gang having a novel bearing construction.

A further object is to provide a disk blade gang wherein the disk blades are held in proper spaced relation and in proper attitude relative to each other by means of tubular spacers which are centered relative to the blades and to a center shaft by centering disks.

Other objects will be apparent from the following specification.

In the drawing:

Fig. 1 is a view of the disk gang in elevation.

Fig. 2 is an enlarged fragmentary longitudinal axial sectional view of the disk gang.

Fig. 3 is an enlarged fragmentary axial sectional view of one end portion of the disk gang.

Fig. 4 is a transverse sectional view taken on line 4—4 of Fig. 2.

Fig. 5 is an enlarged fragmentary axial sectional view of a modified embodiment of the invention.

Referring to the drawing which illustrates the preferred embodiment of the invention, the numeral 10 designates disk blades of any suitable size and shape and constructed in a manner customary in the art. Each of these blades as shown is circular in shape and is of concavo-convex form. All blades used in a single gang are of the same diameter and preferably of the same contour. An elongated rigid bar 12 of non-circular cross-sectional shape, here shown as square in cross-section, extends for the full length of the gang, and the disk blades 10 have central openings of a complementary configuration to fit over the shaft 12 and to be non-rotatable thereon. One end of the shaft 12 is provided with an enlarged head 14, and the opposite end 16 of the shaft 12 is preferably screw-threaded.

Each of the disk blades has a pair of centering disks in engagement with the opposite faces thereof. The centering disks 18 are configured or contoured to bear against the convex face of the blades, and the centering disks 20 are contoured to fit against the concave face of the blades. These centering disks are preferably of substantially the same diameter and have central openings therein of a size and shape to fit snugly around the shaft 12. The centering disks 18 may have a slightly smaller radius of curvature than the blades 10 and have an annular offset 22 formed therein, the same preferably having selected inner and outer diameters for purposes to be set forth hereinafter. The inner centering disks 20 have annular offsets 24 formed therein whose inner and outer diameters correspond with the diameters of the offset 22 of the centering disk 18. If desired, the centering disks 18 and 20 may be secured rigidly or fixedly to the disk blades 10, but this is not required or essential. The securing, as by spot welding, of the centering disks to the blade will serve to reinforce the disk but otherwise serves no function where the openings in said centering disks fit snugly around the shaft 12 to be held in concentric relation thereby. Rigid metal spacer tubes 26 of a length equal to the spacing desired between the disk blades 10 bear at their opposite ends against the centering disks 18 and 20. Each spacer tube 26 is preferably of such a diameter that its opposite ends will fit snugly around the projections or offsets 22 and 24 of the rings 18 and 20 to be held in concentric relation with the shaft 12, as best shown in Fig. 2. The spacers are interposed between the various disks making up the disk gang with the exception of two spaces adjacent opposite ends of the gang which are to mount the bearings for the disk gang.

The bearing units are designated generally by the numeral 30, being located adjacent opposite ends of the gang for connection of the gang with the frame of the harrow or other implement on which the disk blade gangs are to be mounted. The construction of these bearings is best shown in Fig. 2 and consists of an inner tubular member 32 of a length selected to space the adjacent disk blades the desired distance apart to correspond with the spacing of the other disk blades by the tubes 26. The tube 30 is of such a diameter that its ends bear against the offsets 22 and 24 at the inner or small diameter shoulders thereof. A tubular bearing member 36, preferably formed of wood such as hard maple, snugly encircles and is supported by the tube 32 for rotation relative thereto. An outer tube 38 encircles and embraces the tube 36, preferably being of a diameter substantially equal to the diameter of the tubular spacers 26. A plate 40 is welded or otherwise fixedly secured to the tube 38, the same preferably being of the form best shown in Fig. 1, and being so positioned that one end portion projects beyond the tube 38 and has an opening 42 formed in its projecting portion adapted for connection with and fitting upon the frame of the harrow to interconnect the gang with the harrow frame.

The parts are held together in operative relation by end thrust in an inward direction exerted against the outermost disk blades 10. Thus the head 14 at one end of the bar bears against the centering disk 18 on the blade adjacent to said head or against any other suitable washer or abutment member (not shown); and a spring washer 44, preferably of concavo-convex form as illustrated in Fig. 3, encircles the other end of the shaft 12 and bears against the outermost disk 10 adjacent thereto or against a washer or a centering ring as shown. A nut 46 is threaded upon the end 16 of the shaft 12 and serves to draw the parts into firm operative engagement and position.

It will be apparent that, when the disk blade gang is assembled as illustrated by the tightening of the nut 46 upon the shaft 12 to bring all of the constituent parts into firm assembled relation, a rigid and sturdy construction is provided. The disk blades are held in proper spaced relation and in desired attitude with respect to the shaft 12 by the spacer tubes 26 and the tubes 32 of the bearings. A uniform radial distribution of weight is assured by this construction and requisite strength is obtained without danger of tilting or play of the disk blades 10. It will be apparent that the tubes 26 and 32 are inherently strong by virtue of their shape and will not buckle or become distorted incident to stresses applied thereto in use. These tubes 26 and 32 are held in co-axial relation to the shaft 12 by the offsets 22 and 24 upon the centering rings 18 and 20, thus assuring a balanced relation of the parts at all times. Centering rings 18 and 20 serve to reinforce the disk blades and may extend to any selected radial dimension for this purpose. It will be apparent that the entire construction is light in weight as compared to spacers which are formed of metal castings, as has been customary in this art heretofore. The function of the spring washer 44, and of the comparatively deep-dished rings 18, is to impart a spring tension to the assembly, thereby affording a certain amount of resiliency in the event an obstacle is struck during the operation of the disk gang for its intended purpose as a part of a disk harrow. At the same time this tension assures that the parts will be effectively held together and will not loosen incident to vibration. A further function of the washer 44 is to hold the nut 46 against rotation or loosening upon the shaft 12.

The construction of the bearings is likewise adapted to provide a light weight smoothly functioning bearing having minimum friction. The wood bearing 36 permits relative rotation between the same and the inner tube 32, providing a large surface area to minimize wear due to friction. The wood bearing is of comparatively light weight and, if selected of proper material such as hard maple, will have the necessary strength and anti-friction properties to serve its desired purpose. The outer sleeve 38 which embraces the wood bearing 36 serves to reinforce that bearing to prevent splitting thereof, to assure equal or uniform distribution of stresses thereto, and to protect the same against cutting thereof in the event an obstacle strikes the bearing. The metal sleeve 38 also forms a part to which the plate 40 may be anchored effectively as by welding.

It will be apparent that this construction is particularly well suited for use in harrows of the lift-up type which are connected to a tractor by a power lift hitch. A large proportion of the weight of a harrow is made up of the disk gangs, and these disk gangs are customarily located rearwardly of the hitch so that the leverage thereof is quite great. Thus a harrow provided with disk blade gangs of this construction, and of the light weight resulting from this construction, requires less force to raise it from a working position to an elevated transport position than would be required in conventional harrows using castings and like heavy parts as spacers and bearings.

If desired, the centering disks 18 and 20 may be dispensed with by forming the disk blades themselves with annular offsets to provide annular shoulders against which the ends of the tubular members 26 and 32 may bear to center the same relative to said disks. In this instance it may be desirable that the shoulders have a conical shape to facilitate the centering functions of the tubes with respect thereto.

An alternative construction is illustrated in Fig. 5, wherein parts similar to those employed in the previously described embodiment bear the same reference numerals. In this construction the opposite ends of the spacer tubes 26 have centering members 50 and 52 mounted therein. Each of these centering members has a central opening of a size and shape to fit slidably but non-rotatably upon the elongated shaft 12 and has marginal flange portions 54 which are spot welded or otherwise secured to the spacer tubes 26 at 56. In the form of the centering members 50 and 52 herein shown, the same are formed from rectangular metal plates whose corner portions are bent perpendicularly to define the flanges 54. This construction is illustrative only and it will be understood that the members 50 and 52 may be formed of cup-shape or any other desired construction which will permit their secure connection in desired position to and within the tubes 26 at their ends. In this construction the use of centering disks 18 and 20 of the type above described can be omitted. It is desired, however, to provide a certain spring or resilience at each disk plate in the assembly, and for this purpose a concavo-convex disk 58, whose radius of curvature is slightly less than the radius of curvature of the blade 10 and whose diameter is slightly larger than the diameter of the tubes 26, is positioned in engagement with the convex face of the disk plate. It will be apparent that this construction permits the spacers with their centering means to be pre-formed as a unit and applied as a unit in the assembly of the device, thus reducing the number of parts which must be handled during final assembly. Furthermore, the construction by virtue of the spring disk 58 affords a certain amount of resilience since the construction may be tensioned by the inward pressing of each of the spacer tubes 26 against the disk blade 10, thus stressing or tensioning said disk 58 and assuring a firm positioning of the disk blade while at the same time affording a small amount of resilience to accommodate the limited deflection of the blade 10. The same construction of centering a disk fixedly secured within the ends of the spacer tubes 26 may be employed in the construction of the inner tubes 32 of the bearing members.

While the preferred embodiment of the invention has been illustrated and described herein, it will be understood that changes may be made therein within the scope of the appended claims without departing from the spirit of the invention.

I claim:

1. A disk blade gang comprising an elongated rigid shaft, a plurality of disk blades mounted non-rotatably on said shaft in spaced relation, dished plates associated with each blade and having circumferential off-set abutment surfaces and a central shaft-receiving aperture, tubular rigid spacers having a uniform bore encircling said shaft with clearance and interposed between said blades in engagement with said abutments in concentric relation to said shaft, and means on said shaft for drawing said blades, plates and spacers into firm engagement, each dished plate providing two abutment surfaces concentric with each other and with said blade, certain of said spacers engaging the outer surface of adjacent circumferential abutments and at least two spacers being smaller in diameter to engage the inner surfaces of adjacent circumferential abutments, a sleeve rotatably encircling said small spacers, and a connector carried by each sleeve.

2. A disk blade gang comprising a shaft, a plurality of disk blades mounted on said shaft in spaced relation, thin gage spacer tubes interposed between said blades, sheet metal washers, means on said washers for supporting the ends of said tubes, and means for securing said blades, washers and tubes together in a rigid unitary structure, said washers each having a centering aperture fitting said shaft and each engaging the blade adjacent thereto continuously at substantially the diameter of the end of the tube supported thereby, said washers being of larger diameter than said tubes and the outer margin of each washer continuously engaging the adjacent blade outwardly of the tube supported thereby to strengthen and reinforce said blade, said tubes being of substantially uniform wall thickness throughout and having a bore of greater dimension than said shaft located substantially concentric with said shaft.

JABEZ A. LOVE.

References Cited in the file of this patent

UNITED STATES PATENTS

| Number | Name | Date |
|---|---|---|
| 840,288 | Barker | Jan. 1, 1907 |
| 1,155,289 | Strom et al. | Sept. 28, 1915 |
| 1,416,906 | Strom et al. | May 23, 1922 |
| 2,253,391 | Ohlendorf | Aug. 19, 1941 |
| 2,256,220 | Sjogren | Sept. 16, 1941 |
| 2,272,100 | Thomas et al. | Feb. 3, 1942 |
| 2,324,064 | Coffing | July 13, 1943 |
| 2,331,738 | Seaholm | Oct. 12, 1943 |
| 2,421,306 | White | May 27, 1947 |
| 2,527,234 | Taylor | Oct. 24, 1950 |